(12) United States Patent
Yu et al.

(10) Patent No.: US 10,454,138 B2
(45) Date of Patent: Oct. 22, 2019

(54) NON-AQUEOUS ELECTROLYTE ADDITIVE, NON-AQUEOUS ELECTROLYTE COMPRISING THE SAME, AND LITHIUM SECONDARY BATTERY INCLUDING NON-AQUEOUS ELECTROLYTE

(71) Applicant: LG Chem, Ltd., Seoul (KR)

(72) Inventors: Sung Hoon Yu, Daejeon (KR); Yoo Sun Kang, Daejeon (KR); Kyung Mi Lee, Daejeon (KR)

(73) Assignee: LG Chem, Ltd. (KR)

( * ) Notice: Subject to any disclaimer, the term of this patent is extended or adjusted under 35 U.S.C. 154(b) by 38 days.

(21) Appl. No.: 15/735,741

(22) PCT Filed: Oct. 26, 2016

(86) PCT No.: PCT/KR2016/012093
§ 371 (c)(1),
(2) Date: Dec. 12, 2017

(87) PCT Pub. No.: WO2017/074027
PCT Pub. Date: May 4, 2017

(65) Prior Publication Data
US 2018/0191031 A1     Jul. 5, 2018

(30) Foreign Application Priority Data

Oct. 29, 2015  (KR) .................. 10-2015-0150733
Oct. 25, 2016  (KR) .................. 10-2016-0139012

(51) Int. Cl.
*H01M 10/0567*  (2010.01)
*H01M 10/052*   (2010.01)
*H01M 10/0569*  (2010.01)

(52) U.S. Cl.
CPC ...... *H01M 10/0567* (2013.01); *H01M 10/052* (2013.01); *H01M 10/0569* (2013.01); *H01M 2300/0037* (2013.01)

(58) Field of Classification Search
CPC ................................................. H01M 10/0567
See application file for complete search history.

(56) References Cited

U.S. PATENT DOCUMENTS

2008/0083626 A1   4/2008  Kubo et al.
2011/0262815 A1  10/2011  Han et al.
(Continued)

FOREIGN PATENT DOCUMENTS

JP    2008179622 A      8/2008
KR    20110119054 A    11/2011
(Continued)

OTHER PUBLICATIONS

Definition15735741 (Year: 2019).*
Search report from International Application No. PCT/KR2016/012093, dated Feb. 1, 2017.

*Primary Examiner* — Sarah A. Slifka
*Assistant Examiner* — Brian R Ohara
(74) *Attorney, Agent, or Firm* — Lerner, David, Littenberg, Krumholz & Mentlik, LLP

(57) ABSTRACT

The present invention relates to: a non-aqueous electrolyte additive comprising, as a substituent, at least one cyano group and/or at least one fluorine element; a non-aqueous electrolyte for a lithium secondary battery, comprising the same; and a lithium secondary battery including the non-aqueous electrolyte.

8 Claims, 2 Drawing Sheets

(56) References Cited

U.S. PATENT DOCUMENTS

| | | | |
|---|---|---|---|
| 2012/0171581 A1 | 7/2012 | Abe et al. | |
| 2013/0230781 A1 | 9/2013 | Yu et al. | |
| 2014/0248529 A1* | 9/2014 | Chen | H01M 4/485 429/163 |
| 2014/0302401 A1* | 10/2014 | Burkhardt | H01M 10/0525 429/333 |
| 2018/0034101 A1* | 2/2018 | Lee | H01M 10/0565 |

FOREIGN PATENT DOCUMENTS

| | | |
|---|---|---|
| KR | 101249350 B1 | 4/2013 |
| KR | 20140037622 A | 3/2014 |
| KR | 20140067242 A | 6/2014 |
| WO | 2013176275 A1 | 11/2013 |

\* cited by examiner

NON-AQUEOUS ELECTROLYTE ADDITIVE, NON-AQUEOUS ELECTROLYTE COMPRISING THE SAME, AND LITHIUM SECONDARY BATTERY INCLUDING NON-AQUEOUS ELECTROLYTE

CROSS-REFERENCE TO RELATED APPLICATIONS

The present application is a national phase entry under 35 U.S.C. § 371 of International Application No. PCT/KR2016/012093, filed on Oct. 26, 2016, which claims priority from Korean Patent Application No. 10-2015-0150733, filed on Oct. 29, 2015, and Korean Patent Application No. 10-2016-0139012, filed on Oct. 25, 2016, the disclosures of which are incorporated herein by reference.

TECHNICAL FIELD

The present invention relates to a non-aqueous electrolyte additive, a non-aqueous electrolyte including the same, and a lithium secondary battery including the non-aqueous electrolyte, and particularly, to a non-aqueous electrolyte additive capable of ensuring stability at high voltage and also having improved performance, a non-aqueous electrolyte including the same, and a lithium secondary battery including the non-aqueous electrolyte.

BACKGROUND ART

Recently, as interest in energy storage technology is increasing and the technology has been widely applied to various fields such as mobile phones, camcorders, notebook PCs and electric vehicles, efforts for research on and development of electrochemical devices have materialized.

In this respect, electrochemical devices have attracted the most attention, and interest in secondary batteries that can be charged and discharged among these is increasing. Particularly, among secondary batteries that are currently being used, a lithium secondary battery developed in the early 1990s is getting the most attention due to its high operating voltage and superior energy density.

The lithium secondary battery is composed of a negative electrode made of a carbon material that can occlude and release lithium ions, a positive electrode made of a lithium-transition metal oxide, and a non-aqueous electrolyte.

The lithium secondary battery may be divided into a lithium ion liquid battery (LiLB) using a liquid electrolyte, a lithium ion polymer battery (LiPB) using a gel-type polymer electrolyte, a lithium polymer battery (LPB) using a solid polymer electrolyte, and the like according to the type of used electrolyte.

Recently, as the lithium secondary battery has been widely applied to various fields, there is an increasing demand for a lithium secondary battery that can be safely charged even at high voltage while maintaining excellent cycle lifespan characteristics even in harsher environments such as high or low-temperature, high-voltage charging, or the like.

Meanwhile, as the charging and discharging of a secondary battery proceed, the structure of a positive electrode active material is destroyed, and thus performance of a positive electrode is degraded. Also, when the structure of a positive electrode is destroyed, metal ions eluted from a surface of a positive electrode are electrodeposited on a negative electrode, and thus the negative electrode is deteriorated. Such a deterioration of battery performance tends to be further accelerated when the potential of a positive electrode increases or a battery is exposed to high temperature.

In order to solve the above problems, a method in which a material which protects a positive electrode by forming a film on the positive electrode is added to an electrolyte has been proposed.

Prior-Art Documents

Korean Patent Application Publication No. 2014-0067242
Korean Registered Patent No. 1249350

DISCLOSURE

Technical Problem

The present invention is designed to solve the problems of the prior art, and it is an aspect of the present invention to provide a non-aqueous electrolyte additive having an excellent adsorption effect on metal ions eluted from a positive electrode.

In addition, it is another aspect of the present invention to provide a non-aqueous electrolyte for a lithium secondary battery, which includes the non-aqueous electrolyte additive so that stability of the electrolyte upon overcharging may be improved.

Additionally, it is still another aspect of the present invention to provide a lithium secondary battery which includes the non-aqueous electrolyte so that cycle characteristics and high-temperature storage performance may be improved even when being charged at high voltage.

Technical Solution

In order to accomplish the above objectives, according to an embodiment of the present invention, there is provided a non-aqueous electrolyte additive which includes a compound represented by Formula 1 below:

[Formula 1]

In Formula 1,

R is a C1 to C3 alkyl group substituted or unsubstituted with at least one fluorine element, and A is a C1 to C4 alkyl group substituted with at least one fluorine element and/or at least one cyano group (—CN).

In addition, according to another embodiment of the present invention, there is provided a non-aqueous electrolyte for a lithium secondary battery, which includes an ionizable lithium salt; an organic solvent; and the non-aqueous electrolyte additive according to the present invention.

Additionally, according to still another embodiment of the present invention, there is provided a lithium secondary battery which includes a negative electrode, a positive electrode, a separator interposed between the negative electrode and the positive electrode, and the non-aqueous electrolyte according to the present invention.

Advantageous Effects

The present invention provides a non-aqueous electrolyte additive capable of suppressing the decomposition of an electrolyte by forming a more stable ionic conductive film on a surface of a positive electrode, thereby an electrolyte for a lithium secondary battery, which is capable of suppressing the decomposition upon overcharging or suppressing the elution and migration of metal ions, and a lithium secondary battery having improved lifespan characteristics and high-temperature stability at high voltage can be manufactured.

BEST MODE

Figure 1:
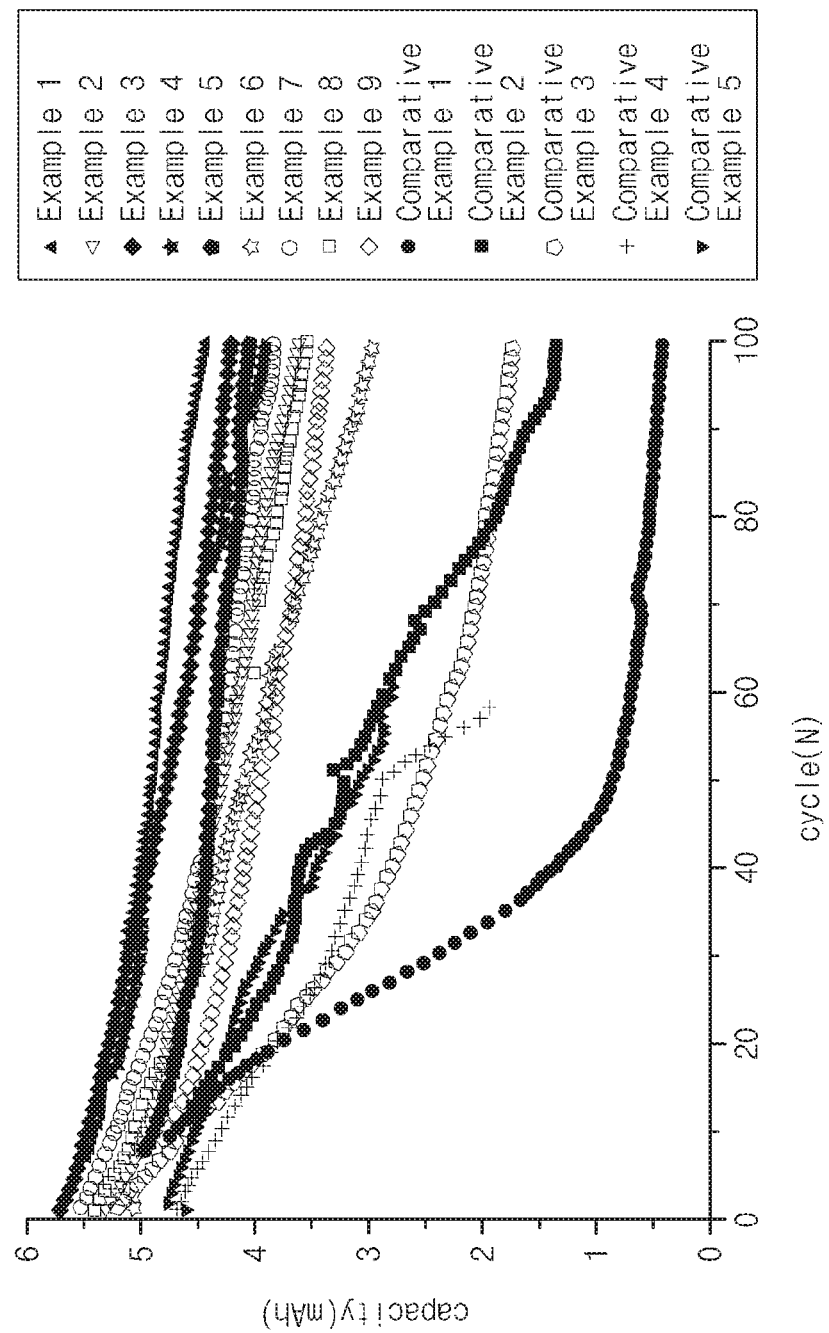
FIG. 1 is a graph illustrating lifespan characteristics of a lithium secondary battery according to Experimental Example 1 of the present invention.

Hereinafter, the present invention will be described in more detail.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

Generally, when a secondary battery is overcharged, an excessive amount of lithium ions is released from a positive electrode, and thus the structure of a positive electrode active material becomes unstable. Also, oxygen is released from such a positive electrode active material with an unstable structure to cause the decomposition of an electrolyte. Particularly, elution of metal ions from a positive electrode is increased at high temperature, and when the metal ions are precipitated on a negative electrode, battery performance is degraded.

Accordingly, the present invention provides a non-aqueous electrolyte additive capable of combining with metal ions eluted from a positive electrode to form a complex.

In addition, the present invention provides a non-aqueous electrolyte for a lithium secondary battery, which includes the non-aqueous electrolyte additive so that stability of the electrolyte upon overcharging may be improved.

Additionally, the present invention provides a lithium secondary battery which includes the non-aqueous electrolyte so that cycle characteristics and high-temperature storage performance may be improved even when being charged at high voltage.

Specifically, according to an embodiment of the present invention, there is provided a non-aqueous electrolyte additive which includes a compound represented by Formula 1 below including at least one cyano group and/or at least one fluorine element as a substituent:

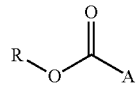

[Formula 1]

In Formula 1,

R is a C1 to C3 alkyl group substituted or unsubstituted with at least one fluorine element, and A is a C1 to C4 alkyl group substituted with at least one fluorine element and/or at least one cyano group (—CN).

Specific examples of the compound represented by Formula 1 include at least one compound selected from the group consisting of compounds represented by Formulas 1a to 1i below.

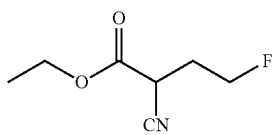

[Formula 1a]

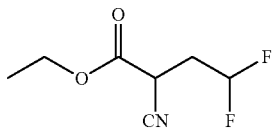

[Formula 1b]

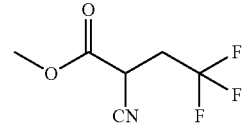

[Formula 1c]

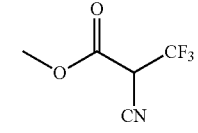

[Formula 1d]

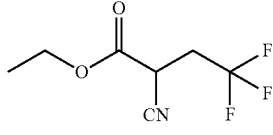

[Formula 1e]

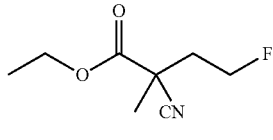

[Formula 1f]

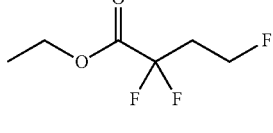

[Formula 1g]

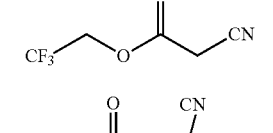

[Formula 1h]

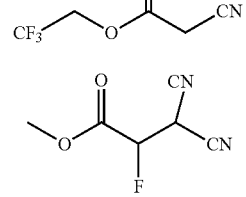

[Formula 1i]

In addition, according to another embodiment of the present invention, there is provided a non-aqueous electrolyte for a lithium secondary battery, which includes an ionizable lithium salt; an organic solvent; and a non-aqueous electrolyte additive, wherein the non-aqueous electrolyte additive includes a compound represented by Formula 1.

In this case, the non-aqueous electrolyte additive may be included at about 0.5 to 5 wt %, particularly, 1 to 5 wt % based on the total weight of the non-aqueous electrolyte. When a content of the additive is less than 0.5 wt %, an effect of stabilizing a solid electrolyte interface (SEI) film to be described below may be insignificant, and when a content thereof is greater than 5 wt %, resistance may be increased due to at least one fluorine element or a cyano group substituted at the end of a compound represented by Formula 1 included in the additive.

In a lithium secondary battery among electrochemical devices, a kind of passivation film is formed by electrochemical oxidative decomposition of an electrolyte at a positive electrode of the battery, particularly, a position where the surface bonding is present or an activated position, and this passivation film increases impedance with respect to co-intercalation of lithium ions into a positive electrode active material. Also, when charging and discharging are repeated, ions of Co, Mn, and Ni are eluted due to structural destruction of a positive electrode active material or chemical dissolution caused by an electrolyte. These reactions result in degradation of the performance of a positive electrode itself and simultaneously electrodeposition of eluted metal ions on a surface of a negative electrode. The metal which is electrodeposited on a negative electrode generally has high reactivity with an electrolyte. Therefore, as charging and discharging proceed, an irreversible reaction is increased due to a decrease in an amount of reversible lithium ions, which results in the degradation of capacity and lifespan characteristics of the battery.

Accordingly, the present invention provides, as an electrolyte additive, a compound containing a cyano group (—CN) which is likely to combine with metal ions of Co, Mn, Ni, and the like to form a complex.

That is, since the non-aqueous electrolyte additive including a compound represented by Formula 1 according to the present invention includes a polar cyano group which easily adsorbs an eluted metal ion, the additive may combine with metal ions eluted from a positive electrode due to structural destruction of a positive electrode active material or chemical dissolution caused by an electrolyte during charging and discharging of a battery to form a complex, and thus a stable ionic conductive film may be formed on a surface of a positive electrode. Also, since the non-aqueous electrolyte additive including a compound represented by Formula 1 according to the present invention includes at least one fluorine element as a substituent, a film may be more easily formed, and the film thus formed may also have increased ionic conductivity. Moreover, a compound represented by Formula 1 according to the present invention adsorbs metal ions eluted from a positive electrode even in a state in which a film is not formed, and thus electrodeposition of the metal ions on a negative electrode may be suppressed. Therefore, in the lithium secondary battery including the non-aqueous electrolyte including such an additive according to the present invention, lithium ions are smoothly occluded and released from a negative electrode even at high temperature, and thus overall performance of the secondary battery such as room-temperature and high-temperature lifespan characteristics may be significantly improved.

Meanwhile, in the non-aqueous electrolyte according to the present invention, the lithium salt included as an electrolyte may be a lithium salt commonly used in an electrolyte for a lithium secondary battery without limitation. For example, the lithium salt includes $Li^+$ as a cation, and any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Also, the lithium salt may be one or a mixture of two or more thereof as necessary. Although the lithium salt may be appropriately adjusted within a commonly usable range, it may be included at a concentration of 0.8 to 1.5 M in an electrolyte to accomplish an effect of forming an optimum film for preventing an electrode surface from being corroded.

In addition, the organic solvent included in the non-aqueous electrolyte according to the present invention may be a solvent commonly used in an electrolyte for a lithium secondary battery without limitation. For example, the organic solvent includes any one or a mixture of two or more of an ether compound, an ester compound, an amide compound, a linear carbonate compound, a cyclic carbonate compound, and the like. Among these, a cyclic carbonate compound, a linear carbonate compound, or a mixture thereof may be typically included.

Specific examples of the cyclic carbonate compound include any one or a mixture of two or more selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC). Also, specific examples of the linear carbonate compound include any one or a mixture of two or more selected from the group consisting of dimethyl carbonate (DMC), diethyl carbonate (DEC), dipropyl carbonate, ethyl methyl carbonate (EMC), methyl propyl carbonate, and ethyl propyl carbonate, but the present invention is not limited thereto.

In particular, EC and PC, which are cyclic carbonate compounds among the carbonate-based organic solvents, are high-viscosity organic solvents and are preferably used because they dissociate a lithium salt in an electrolyte effectively due to their high dielectric constant. It is preferable that such a cyclic carbonate compound is used in combination with the linear carbonate compound having low viscosity and a low dielectric constant such as DMC and DEC in an appropriate ratio because an electrolyte having high electrical conductivity may be formed.

In addition, the ether compound among the organic solvents may be any one or a mixture of two or more selected from the group consisting of dimethyl ether, diethyl ether, dipropyl ether, methyl ethyl ether, methyl propyl ether, and ethyl propyl ether, but the present invention is not limited thereto.

In addition, the ester compound among the organic solvents may be any one or a mixture of two or more selected from the group consisting of a linear ester such as methyl acetate, ethyl acetate, propyl acetate, methyl propionate, ethyl propionate, propyl propionate, and butyl propionate; and a cyclic ester such as γ-butyrolactone, γ-valerolactone, γ-caprolactone, σ-valerolactone, and ε-caprolactone, but the present invention is not limited thereto.

Additionally, according to still another embodiment of the present invention, there is provided a lithium secondary battery which includes a positive electrode, a negative electrode, a separator interposed between the positive electrode and the negative electrode, and a non-aqueous electrolyte, wherein the electrolyte is the electrolyte according to the present invention.

Specifically, the lithium secondary battery according to the present invention may be manufactured by injecting the non-aqueous electrolyte according to the present invention into an electrode assembly composed of the positive electrode, the negative electrode, and the separator interposed between the positive electrode and the negative electrode. Here, the positive electrode, the negative electrode, and the separator, which constitute the electrode assembly, may be materials commonly used in manufacturing a lithium secondary battery.

In this case, the positive electrode may be manufactured by applying a positive electrode mixture including a positive electrode active material, a binder, a conductive material, a solvent and the like on a positive electrode current collector.

The positive electrode current collector is not particularly limited as long as it does not cause a chemical change in the battery and has conductivity. For example, stainless steel, aluminum, nickel, titanium, calcined carbon, or aluminum or stainless steel whose surface is treated with carbon, nickel, titanium, silver or the like may be used as the positive electrode current collector.

The positive electrode active material may be a compound capable of reversible intercalation and deintercalation of lithium ions, and particularly, may include a lithium composite metal oxide containing lithium and one or more metals such as cobalt, manganese, nickel or aluminum. More particularly, the lithium composite metal oxide may be any one or a mixture of two or more of lithium-manganese-based oxides (e.g., $LiMnO_2$, $LiMn_2O_4$ or the like), lithium-cobalt-based oxides (e.g., $LiCoO_2$ or the like), lithium-nickel-based oxides (e.g., $LiNiO_2$ or the like), lithium-nickel-manganese-based oxides (e.g., $LiNi_{1-Y}Mn_YO_2$ (here, $0<Y<1$), $LiMn_{2-Z}Ni_ZO_4$ (here, $0<Z<2$) or the like), lithium-nickel-cobalt-based oxides (e.g., $LiNi_{1-Y1}Co_{Y1}O_2$ (here, $0<Y1<1$) or the like), lithium-manganese-cobalt-based oxides (e.g., $LiCo_{1-Y2}Mn_{Y2}O_2$ (here, $0<Y2<1$), $LiMn_{2-Z1}Co_{Z1}O_4$ (here, $0<Z1<2$) or the like), lithium-nickel-manganese-cobalt-based oxides (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$) or the like), or lithium-nickel-cobalt-transition metal (M) oxides (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3 and s2 represent an atomic fraction of each independent element, and satisfy $0<p2<1$, $0<q2<1$, $0<r3<1$, $0<s2<1$, and $p2+q2+r3+s2=1$) or the like). Among these, in view of possibly increasing the capacity characteristic and stability of the battery, the lithium composite metal oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$ or the like), or a lithium-nickel-cobalt-aluminum-based oxide (e.g., $Li(Ni_{0.8}Co_{0.15}Al_{0.05})O_2$ or the like). In consideration of the remarkableness of an improvement effect according to control of types and content ratios of components constituting the lithium composite metal oxide, the lithium composite metal oxide may be any one or a mixture of two or more selected from $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$.

The positive electrode active material may be included at 80 to 99 wt % based on the total weight of the positive electrode mixture.

The conductive material is commonly added at 1 to 30 wt % based on the total weight of the positive electrode mixture.

Such a conductive material is not particularly limited as long as it does not cause a chemical change in the battery and has conductivity. For example, the conductive material is graphite; a carbon-based material such as carbon black, acetylene black, Ketjen black, channel black, furnace black, lamp black, thermal black or the like; a conductive fiber such as carbon fiber, metallic fiber or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. Specific examples of a commercially available conductive material include the acetylene black series (commercially available from Chevron Chemical Company), Denka black (Denka Singapore Private Limited or Gulf Oil Company products), Ketjen black, the EC series (commercially available from Armak Company), Vulcan XC-72 (commercially available from Cabot Company) and Super P (commercially available from Timcal).

The binder is a component that assists binding between an active material and a conductive material and binding to a current collector, and is commonly added at 1 to 30 wt % based on the total weight of the positive electrode mixture. Such a binder is, for example, polyvinylidene fluoride (PVDF), polyvinyl alcohol, carboxymethyl cellulose (CMC), starches, hydroxypropyl cellulose, regenerated cellulose, polyvinyl pyrrolidone, tetrafluoroethylene, polyethylene, polypropylene, an ethylene-propylene-diene terpolymer (EPDM), a sulfonated EPDM, styrene-butadiene rubber, fluororubber, one of various copolymers thereof or the like.

In addition, the negative electrode may be manufactured, for example, by applying a negative electrode mixture including a negative electrode active material, a binder, a conductive material, a solvent, and the like on a negative electrode current collector.

The negative electrode current collector generally has a thickness of 3 to 500 μm. Such a negative electrode current collector is not particularly limited as long as it does not cause a chemical change in the battery and has high conductivity. For example, copper, stainless steel, aluminum, nickel, titanium, calcined carbon, copper or stainless steel whose surface is treated with carbon, nickel, titanium, silver, or the like, an aluminum-cadmium alloy, or the like may be used as the negative electrode current collector. Also, the negative electrode current collector, like the positive electrode current collector, may have fine irregularities at a surface thereof to increase adhesion of the negative electrode active material. In addition, the negative electrode current collector may be used in any of various forms such as a film, a sheet, a foil, a net, a porous material, a foam, a non-woven fabric, and the like.

The negative electrode active material may be one or two or more selected from the group consisting of natural graphite, artificial graphite or a carbon material; a metal (Me) such as lithium-containing titanium composite oxide (LTO), Si, Sn, Li, Zn, Mg, Cd, Ce, Ni or Fe; an alloy composed of the metal (Me); an oxide (MeOx) of the metal (Me); and a composite of the metal (Me) and carbon.

The negative electrode active material may be included at 80 to 99 wt % based on the total weight of the negative electrode mixture.

The binder is a component that assists binding between a conductive material, an active material, and a current collector, and is commonly added at 1 to 30 wt % based on the total weight of the negative electrode mixture. Such a binder is, for example, PVDF, polyvinyl alcohol, CMC, starches, hydroxypropyl cellulose, regenerated cellulose, polyvinyl pyrrolidone, tetrafluoroethylene, polyethylene, polypropylene, an ethylene-propylene-diene polymer (EPDM), a sulfonated EPDM, styrene-butadiene rubber, fluororubber, one of various copolymers thereof or the like.

The conductive material is a component for further improving the conductivity of the negative electrode active material and may be added at 1 to 20 wt % based on the total weight of the negative electrode mixture. Such a conductive material is not particularly limited as long as it does not cause a chemical change in the battery and has conductivity. For example, graphite such as natural graphite, artificial graphite or the like; carbon black such as acetylene black, Ketjen black, channel black, furnace black, lamp black, thermal black or the like; a conductive fiber such as carbon fiber, metallic fiber or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like may be used as the conductive material.

The solvent may be water or an organic solvent such as N-methyl-2-pyrrolidone (NMP) or the like, and may be used in an amount in which preferable viscosity is exhibited when the negative electrode active material and optionally a binder, a conductive material and the like are included. For example, the solvent may be included in such a way that a solid concentration including the negative electrode active material and optionally including a binder and a conductive material is 50 to 95 wt %, preferably, 70 to 90 wt %.

In addition, the separator may be a common porous polymer film used as a conventional separator, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof. Alternatively, the separator may be a common porous non-woven fabric, for example, a non-woven fabric made of glass fiber with a high melting point, polyethylene terephthalate fiber or the like, but the present invention is not limited thereto.

The appearance of the lithium secondary battery according to the present invention is not particularly limited, but it may be in any of various forms such as a cylindrical form, a prismatic form, a pouch form, a coin form and the like, which use a can.

Mode for Invention

Hereinafter, the present invention will be described in detail with reference to embodiments. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

EXAMPLES

Hereinafter, the present invention will be described in detail with reference to embodiments. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Example 1

(Preparation of Non-Aqueous Electrolyte)

Fluoroethylene carbonate (FEC), propylene carbonate (PC), and ethylene carbonate (EMC) were mixed in a weight ratio of 30:10:60 (vol %) to prepare an organic mixed solvent. Afterward, a compound represented by Formula 1a was further added at 0.5 wt % based on the total weight of the prepared organic mixed solvent, and $LiPF_6$ was dissolved in the resulting solvent at a concentration of 1 M to prepare a non-aqueous electrolyte.

(Manufacture of Positive Electrode)

40 parts by weight of a positive electrode mixture, in which a lithium cobalt composite oxide ($LiCO_2$) as a positive electrode active material particle, carbon black as a conductive material, and polyvinylidene fluoride (PVDF) as a binder were mixed in a weight ratio of 90:5:5 (wt %) based on 100 parts by weight of N-methyl-2-pyrrolidone (NMP) as a solvent, was added to prepare a positive electrode mixture. The positive electrode mixture was applied on a positive electrode current collector (Al thin film) having a thickness of 100 μm, dried, and roll-pressed to manufacture a positive electrode.

(Manufacture of Negative Electrode)

80 parts by weight of a negative electrode mixture, in which natural graphite as a negative electrode active material, PVDF as a binder, and carbon black as a conductive material were mixed in a weight ratio of 95:2:3 (wt %) based on 100 parts by weight of NMP as a solvent, was added to prepare a negative electrode mixture. The negative electrode mixture was applied on a negative electrode current collector (Cu thin film) having a thickness of 90 μm, dried, and roll-pressed to manufacture a negative electrode.

(Manufacture of Secondary Battery)

A coin-type battery was manufactured by a common method using the positive electrode and the negative electrode manufactured by the above-described methods together with a porous polyethylene film, and then the prepared non-aqueous electrolyte was injected to the battery to manufacture a lithium secondary battery.

Example 2

An electrolyte and a battery including the same were manufactured in the same manner as in Example 1 except that a compound represented by Formula 1b was included, instead of a compound represented by Formula 1a, as an additive when the non-aqueous electrolyte was prepared.

Example 3

An electrolyte and a battery including the same were manufactured in the same manner as in Example 1 except that a compound represented by Formula 1c was included, instead of a compound represented by Formula 1a, as an additive when the non-aqueous electrolyte was prepared.

Example 4

An electrolyte and a battery including the same were manufactured in the same manner as in Example 1 except that a compound represented by Formula 1d was included, instead of a compound represented by Formula 1a, as an additive when the non-aqueous electrolyte was prepared.

Example 5

An electrolyte and a battery including the same were manufactured in the same manner as in Example 1 except that a compound represented by Formula 1e was included, instead of a compound represented by Formula 1a, as an additive when the non-aqueous electrolyte was prepared.

Example 6

An electrolyte and a battery including the same were manufactured in the same manner as in Example 1 except that a compound represented by Formula 1f was included, instead of a compound represented by Formula 1a, as an additive when the non-aqueous electrolyte was prepared.

Example 7

An electrolyte and a battery including the same were manufactured in the same manner as in Example 1 except that a compound represented by Formula 1g was included, instead of a compound represented by Formula 1a, as an additive when the non-aqueous electrolyte was prepared.

Example 8

An electrolyte and a battery including the same were manufactured in the same manner as in Example 1 except that a compound represented by Formula 1h was included, instead of a compound represented by Formula 1a, as an additive when the non-aqueous electrolyte was prepared.

Example 9

An electrolyte and a battery including the same were manufactured in the same manner as in Example 1 except that a compound represented by Formula 1a was included at 5 wt % as an additive when the non-aqueous electrolyte was prepared.

Comparative Example 1

An electrolyte and a battery including the same were manufactured in the same manner as in Example 1 except that a compound represented by Formula 1a was not added as an additive.

Comparative Example 2

An electrolyte and a battery including the same were manufactured in the same manner as in Example 1 except that a compound represented by Formula 2a was included, instead of a compound represented by Formula 1a, as an additive when the non-aqueous electrolyte was prepared.

[Formula 2a]

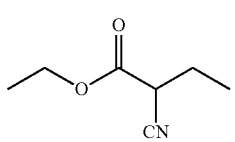

Comparative Example 3

An electrolyte and a battery including the same were manufactured in the same manner as in Example 1 except that a compound represented by Formula 2b was included, instead of a compound represented by Formula 1a, as an additive when the non-aqueous electrolyte was prepared.

[Formula 2b]

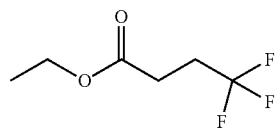

Comparative Example 4

An electrolyte and a battery including the same were manufactured in the same manner as in Example 1 except that a compound represented by Formula 1a was added at 7 wt % as an additive when the non-aqueous electrolyte was prepared.

Comparative Example 5

An electrolyte and a battery including the same were manufactured in the same manner as in Example 1 except that a compound represented by Formula 2c was included instead of a compound represented by Formula 1a.

[Formula 2c]

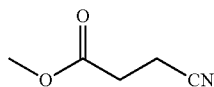

EXPERIMENTAL EXAMPLES

Experimental Example 1: Lifespan Characteristics

The batteries manufactured in Examples 1 to 9 and Comparative Examples 1 to 5 (battery capacity: 5.5 mAh) were charged at 60° C. at a constant current of 0.7 C until 4.35 V, then charged at a constant voltage of 4.35 V, and the charging was completed when a charging current reached 0.275 mA. Afterward, the batteries were allowed to stand for 10 minutes and then discharged at a constant current of 0.5 C until 3.0 V. 100 cycles of the charging and discharging were performed, and then capacities of the batteries were measured, results of which are shown in FIG. 1.

Here, C refers to a charge and discharge current rate of a battery, that is, C-rate represented as ampere (A), and denoted as a ratio of a common battery's capacity. That is, 1 C of the above-prepared batteries means a current of 5.5 mA.

As shown in FIG. 1, it can be seen that the secondary batteries according to Examples 1 to 9 exhibited excellent cycle lifespan characteristics compared to the secondary batteries according to Comparative Examples 1 to 5.

Experimental Example 2: Electrodeposition Test of Co Ion

For separators of the cells subjected to the above evaluation of high-temperature lifespan characteristics in Experimental Example 1, a concentration of eluted Co ions was measured using an inductively coupled plasma (ICP) analysis method, results of which are shown in Table 1 below.

TABLE 1

|  | Formula | Usage amount | Co (ppm) |
|---|---|---|---|
| Example 1 | 1a | 0.5 wt % | 45 |
| Example 2 | 1b | 0.5 wt % | 48 |
| Example 3 | 1c | 0.5 wt % | 44 |
| Example 4 | 1d | 0.5 wt % | 48 |
| Example 5 | 1e | 0.5 wt % | 52 |
| Example 6 | 1f | 0.5 wt % | 75 |
| Example 7 | 1g | 0.5 wt % | 63 |
| Example 8 | 1h | 0.5 wt % | 57 |
| Example 9 | 1a | 5 wt % | 55 |
| Comparative Example 1 | — | — | 255 |
| Comparative Example 2 | 2a | 0.5 wt % | 208 |
| Comparative Example 3 | 2b | 0.5 wt % | 190 |
| Comparative Example 4 | 1a | 7 wt % | 144 |
| Comparative Example 5 | 2c | 0.5 wt % | 131 |

As shown in Table 1, it can be seen that all of the secondary batteries according to Examples 1 to 9 exhibited a low concentration of eluted Co, that is, 75 ppm or less, whereas all of the secondary batteries according to Comparative Examples 1 to 5 exhibited a high concentration of eluted Co, that is, 190 ppm or higher. Therefore, it can be confirmed that, when the non-aqueous electrolyte including an additive according to the present invention was used, the elution of a metal may be suppressed and a stable film may be formed.

Experimental Example 3: Measurement of Alternating Current (AC) Impedance (ACI)

The lithium secondary batteries according to Examples 1 and 9 and Comparative Example 4 were set at 0% SOC at 25° C. for 1 hour, and then scanned from 50 mHz to 100 kHz to measure AC impedance thereof. In this case, the amplitude of alternating current was 10 mV, and the direct current potential (DC potential) of the battery was 3.74 V. Results thereof are shown in FIG. 2.

Figure 2:
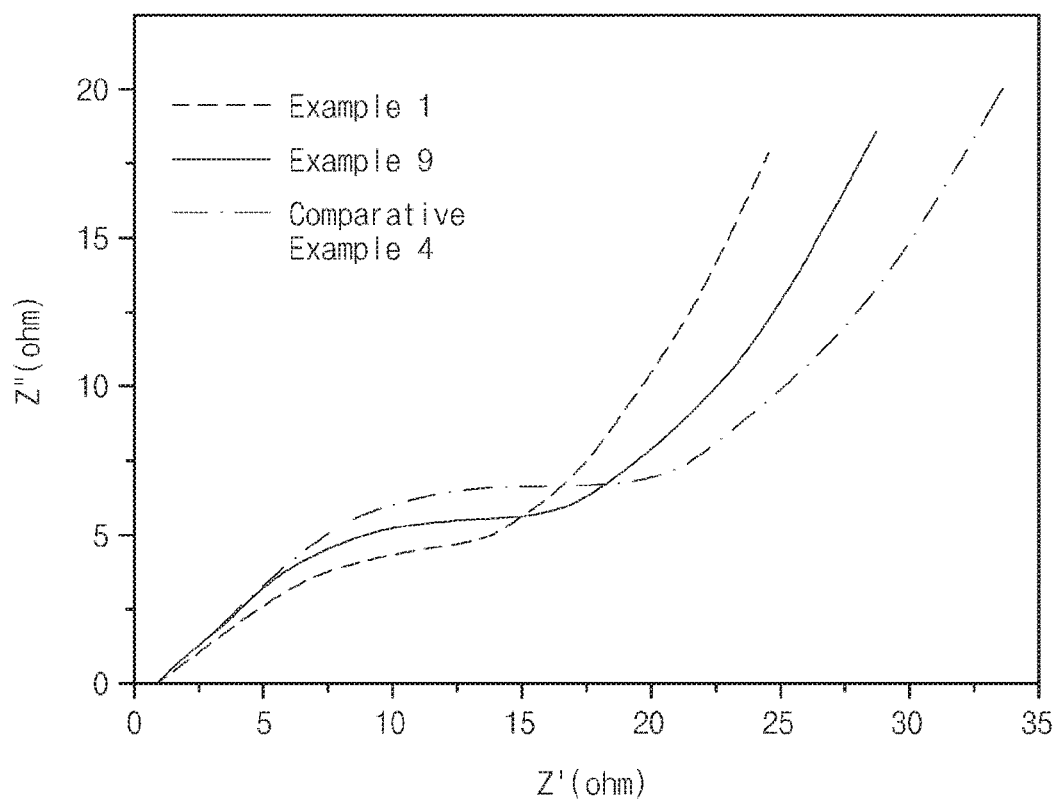
FIG. 2 is a graph illustrating a result of measuring AC impedance according to Experimental Example 3 of the present invention.

In this case, the point of intersection with the X axis in the graph of FIG. 2 indicates ohm resistance of the battery, and the half circle at the latter section indicates resistance caused by a SEI formed on an electrode surface.

That is, a smaller diameter of the half circle means lower resistance caused by a SEI.

As shown in FIG. 2, it can be seen that Comparative Example 4 using a large amount of a compound exhibited a significant increase in resistance compared to Examples 1 and 9. Also, it can be seen that a large amount of Co was eluted and the lifespan was also degraded in the case of Comparative Example 4.

The invention claimed is:

1. A non-aqueous electrolyte additive comprising a compound represented by Formula 1 below:

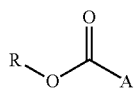

[Formula 1]

in Formula 1, R is a C1 to C3 alkyl group unsubstituted or substituted with at least one fluorine element, and A is a C1 to C4 alkyl group substituted with at least one cyano group (—CN) and optionally further substituted with at least one fluorine element, wherein at least one of R and A contains at least one fluorine element.

2. The non-aqueous electrolyte additive of claim 1, wherein the non-aqueous electrolyte additive comprises at least one compound selected from the group consisting of compounds represented by Formulas 1a to 1f, 1h and 1i below:

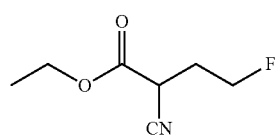

[Formula 1a]

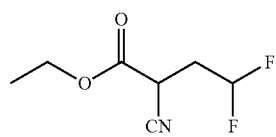

[Formula 1b]

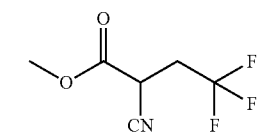

[Formula 1c]

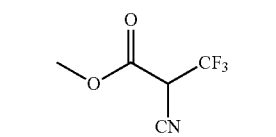

[Formula 1d]

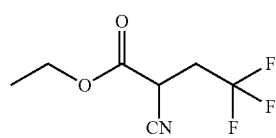

[Formula 1e]

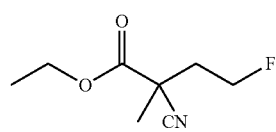

[Formula 1f]

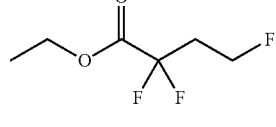

[Formula 1h]

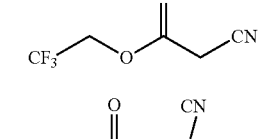

[Formula 1i]

3. A non-aqueous electrolyte for a lithium secondary battery, comprising a lithium salt; an organic solvent; and a non-aqueous electrolyte additive, wherein the non-aqueous electrolyte additive includes a compound represented by Formula 1 below:

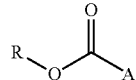
[Formula 1]

in Formula 1, R is a C1 to C3 alkyl group unsubstituted or substituted with at least one fluorine element, and A is a C1 to C4 alkyl group substituted with at least one cyano group (—CN) and optionally further substituted with at least one fluorine element, wherein at least one of R and A contains at least one fluorine element.

4. The non-aqueous electrolyte of claim 3, wherein the non-aqueous electrolyte additive is included at 0.5 to 5 wt % based on a total weight of the non-aqueous electrolyte.

5. The non-aqueous electrolyte of claim 4, wherein the non-aqueous electrolyte additive is included at 1 to 5 wt % based on a total weight of the non-aqueous electrolyte.

6. The non-aqueous electrolyte of claim 3, wherein the lithium salt includes $Li^+$ as a cation and any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

7. The non-aqueous electrolyte of claim 3, wherein the organic solvent includes any one or a mixture of two or more selected from the group consisting of an ether, an ester, an amide, a linear carbonate, and a cyclic carbonate.

8. A lithium secondary battery comprising a negative electrode, a positive electrode, a separator interposed between the negative electrode and the positive electrode, and a non-aqueous electrolyte, wherein the non-aqueous electrolyte is the non-aqueous electrolyte for the lithium secondary battery according to claim 3.

* * * * *